July 7, 1970 R. W. SESSIONS 3,518,997

ELECTRONIC HEART STIMULATOR

Original Filed Sept. 8, 1964

INVENTOR.
Robert W. Sessions

BY Hill, Sherman, Meroni, Gross & Simpson ATTORNEYS

United States Patent Office 3,518,997
Patented July 7, 1970

3,518,997
ELECTRONIC HEART STIMULATOR

Robert W. Sessions, 1309 Lloyd Ave., Lombard, Ill. 60148

Continuation of application Ser. No. 395,079, Sept. 8, 1964. This application Jan. 17, 1969, Ser. No. 796,279
Int. Cl. A61n *1/08*
U.S. Cl. 128—422 13 Claims

ABSTRACT OF THE DISCLOSURE

An electronic stimulator for implantation within a living body for producing electrical pulses for use in connection with the stimulation of tissue within the body, comprising a case for implantation within the body, containing a first oscillatory circuit constructed to provide electrical pulses having predetermined operational characteristics, a second oscillatory circuit constructed to provide electrical pulses having predetermined operational characteristics different from those of the first circuit, such circuits having a common output at which said pulses appear, such case also containing energy supply means for said circuits and magnetic field controlled switch means, actuatable by a magnetic field source external to the body, for selectively operatedly connecting either of said oscillatory circuits to said energy supply means. The oscillatory circuits may be constructed as individually complete and independently operable circuits, and may also have respective separate energy supplies, whereby each circuit may be utilized as a standby circuit, if desired, with its own energy supply, substitutively for the other in the event of failure of the latter.

This application is a continuation of application Ser. No. 395,079, filed Sept. 8, 1964, now abandoned.

This invention relates to an electronic heart stimulating system whereby a small amount of electrical energy is applied to an animal's heart to produce muscular contraction of the heart.

It will be understood in the description of the present invention that the term animal includes human beings, which would be the primary benefactor of such a device.

Heretofore, an electronic heart stimulating system which was inserted in an animal's body provided only one pulsing rate for the animal's heart. Also, heart stimulating systems in the past required frequent removal for replacement of the power source therein, and the interval between replacement of power sources had to be held within their normal life expectancies to eliminate chances of premature heart failure.

Therefore, an object of this invention is to provide novel means for producing different pulsing rates for stimulation of an animal's heart.

Another object of the present invention is to provide a heart stimulating system which has more than one power supply which can be alternately connected to appropriate pulsing circuits.

Still another object of the present invention is to provide a novel means for switching the power supply in and out of the circuits by means external to the animal's body.

A further object of the present invention is to provide novel means for energizing a relay holding coil, which is located inside the animal's body, with a small amount of stored energy thereby eliminating current drain from a power supply over a prolonged period of time.

Figure 1:
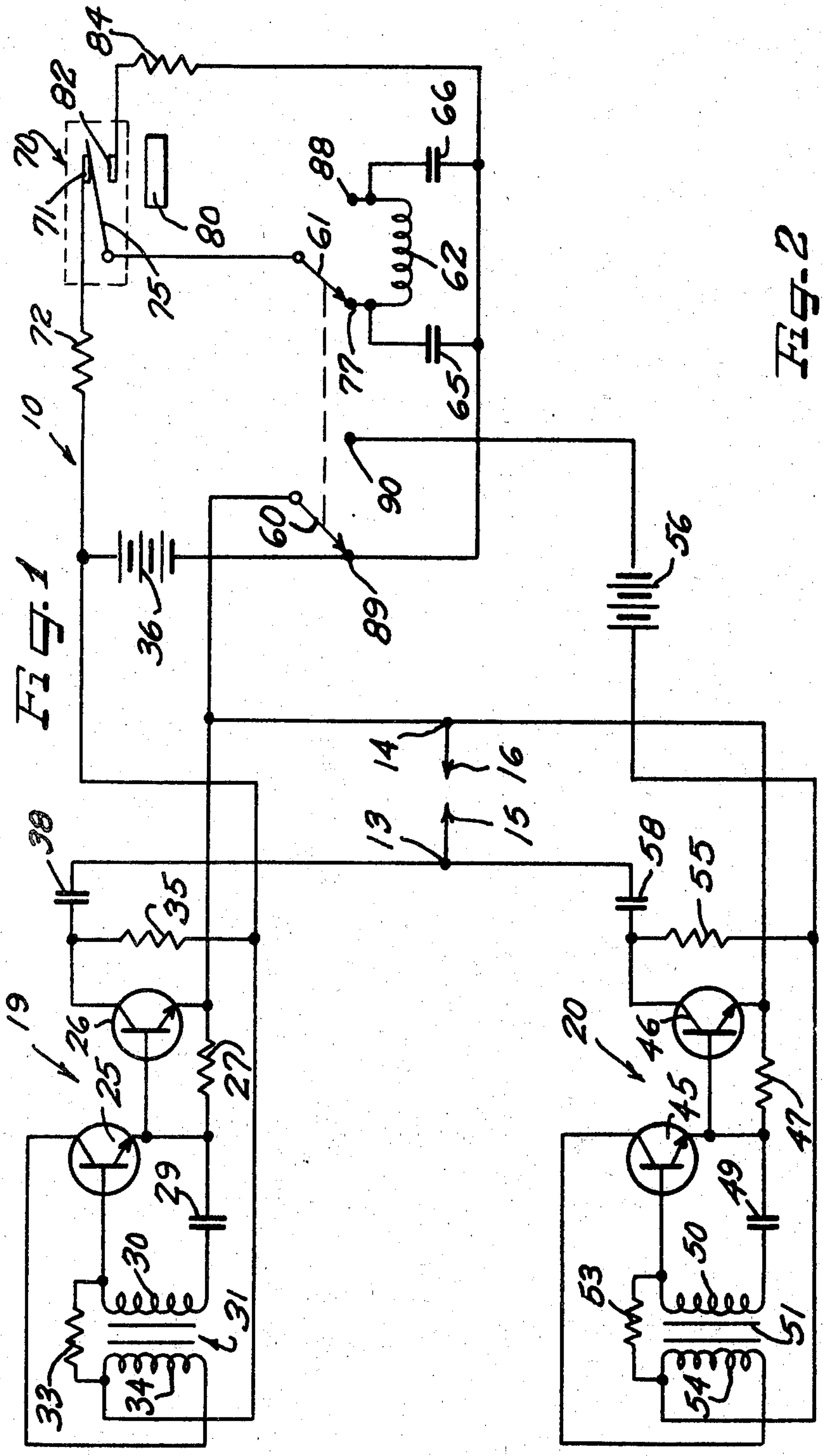
Figure 2:
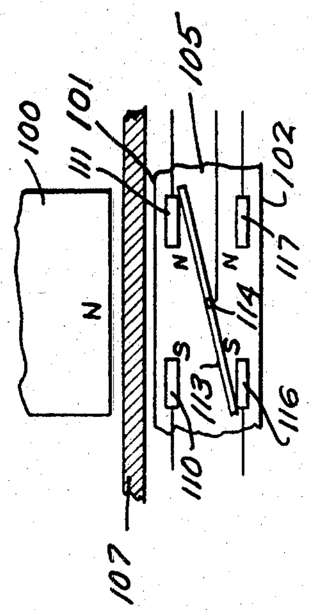

Other objects, features and advantages will become more apparent from the study of the following specification and drawings in which:

FIG. 1 is a schematic diagram of a heart stimulating system constructed in accordance with the principles of this invention; and FIG. 2 is a diagrammatic representation of a switching device having magnetized contact which requires an external magnetic field for actuation.

Shown in FIG. 1 is an electronic heart stimulating system designated generally by the reference numeral 10. A pair of output terminals 13 and 14, which are connected to an animal's heart through a pair of leads 15 and 16, are connected to the outputs of two oscillatory circuits designated generally at 19 and 20. The oscillatory circuits 19 and 20 may have the same pulsing rate for stimulating the heart; however, in the preferred embodiment of the present invention the oscillatory means 20 has a pulse rate greater than that of the oscillatory circuit 19. Therefore, the oscillatory circuit 19 will provide a normal pulse repetition rate which will stimulate an animal's heart during normal activity, and the oscillatory circuit 20, which is rendered operative when the oscillatory circuit 19 is rendered inoperative, will produce an increased pulse repetition rate for stimulating an animal's heart during periods of greater activity.

The oscillatory circuit 19 has a pair of transistors 25 and 26 and a resistor 27 connected between the emitters of each of the transistors. Connected between the base and emitter of transistor 25 is a capacitor 29 and a secondary winding 30 of a transformer 31. The repetition rate of the oscillatory circuit 19 is determined by the capacitor 29 and a resistor 33, which is connected between a primary 34 and the secondary 30 of the transformer 31. Positive voltage from a battery 36 is connected to the collectors of transistors 25 and 26 through the primary winding 34 and a resistor 35 respectively. The transistor 26 is directly coupled to transistor 25 thereby providing a DC amplifier for the oscillatory signal provided by the resistor 33 and capacitor 29. The transformer 31 provides the necessary feedback to maintain oscillation of the circuit 19. When the transistor 26 is rendered conductive by the transistor 25 the output signal therefrom is developed across resistor 35 and applied to the output terminals 13 and 14 through the capacitor 38. By way of example, the signal applied to leads 15 and 16 may be approximately 6 volts having a duration of .2 millisecond and a repetition rate of the oscillatory circuit 19 may be 70 pulses per minute.

The oscillatory circuit 20 has connected therein a pair of transistors 45 and 46 and a resistor 47 connected between the emitters of the transistors. Connected between the base and emitter of transistor 45 is a capacitor 49 and a secondary winding 50 of a transformer 51. Connected between a primary winding 54 and the secondary winding 50 of transformer 51 is a resistor 53, which in conjunction with capacitor 49 determines the repetition rate of oscillatory circuit 20. A positive voltage is supplied to transistors 45 and 46 from the battery 56 through the primary winding 54 and the resistor 55 respectively. The transistor 46 is directly coupled to the transistor 45 to provide a DC amplifier for the oscillatory signal provided by resistor 53 and capacitor 49. When transistor 46 is rendered conductive by the conduction of transistor 45, the output signal therefrom is developed by a resistor 55 and applied to the output terminal 13 through a capacitor 58. The voltage, duration and repetition rate of the oscillatory circuit 20 can be the same as the voltage, duration and repetition rate of the oscillatory circuit 19 however, in the present embodiment, and by way of example, the repetition rate of the oscillatory circuit 20 may be 90 pulses per minute.

According to an important feature of the present invention, switching between oscillatory circuits 19 and 20 is provided by relay contactors 60 and 61, which are operated by a relay holding coil 62. A pair of capacitors 65 and 66 are connected each between a respective end of the relay holding coil 62 and the battery 36. A magnetic reed switch 70 includes a terminal 71 connected through a resistor 72 to the battery 36. A contactor 75 of the magnetic reed switch 70 is shown as being connected through the contactor 61 to a terminal 77 at one end of the relay holding coil 62. A magnet 80 provides external actuation of the contactor 75 and breaks connection thereof with the terminal 71. The magnet 80 causes the contactor 75 to make contact with a terminal 82 of the magnetic reed switch 70 which is connected through a resistance 84 to the capacitors 65 and 66 and the battery 36. Energization of relay holding coil 62 causes the contactor 61 to move from terminal 77 to terminal 88. Since contactor 61 is mechanically coupled as indicated by the dotted line to contactor 60, the contactor 60 moves from a terminal 89 to another terminal 90. The terminal 89 being connected to one side of the battery 36 and the terminal 90 being connected to one side of the battery 56.

Resistor 72 forms part of a charging circuit for the capacitors 65 and 66. The remainder of the charging circuit is formed through the contactor 75 and the contactor 61 to either of terminals 77 or 88. When the magnet 80 is placed in proximity to the reed switch 70, contactor 75 will be actuated to come into engagement with terminal 82 to provide a discharge path for capacitors 65 and 66 to the resistor 84.

With the contactor 61 engaged with terminal 77, as shown in FIG. 1, the capacitor 65 which is discharged through resistor 84 offers no actuating circuit through relay coil 62. However, the capacitor 66, which is also discharged through resistor 84, must also discharge through the relay coil 62 thereby actuating the contactors 60 and 61. When the magnet 80 is removed from proximity with the reed switch 70 contactor 75 will again be engaged with terminal 71 to provide a charge path through resistor 72 to capacitors 65 and 66. Charging circuits for capacitors 65 and 66 will pass through contactor 61, which is now engaged with the terminal 88. Also, the oscillatory circuit 19 which was operative through contactor 60 when engaged with terminal 89 is now rendered inoperative, and the oscillatory circuit 20 is rendered operative through contactor 60 which is engaged with the contact 90, thereby connecting battery 56 to the oscillatory circuit 20 for operation therefrom.

Relay 62 is preferably of the bidirectional type requiring two energizing pulses through the holding coil thereof to return the contactors 60 and 61 to an original condition. By using a relay of this type, which may be referred to as a ratchet relay, the battery 36 is not placed under excessive loads for a prolonged period of time. It can be seen, therefore, that the reed switch 70 merely discharges capacitors 65 and 66 through holding coil 62 for actuation thereof, and thereafter the capacitors 65 and 66 are recharged, through a relatively high resistance 72 in readiness for a subsequent actuation.

Although the heart stimulating system 10 is shown having two oscillatory circuits 19 and 20 and two voltage sources 36 and 56, it is not to be construed as a limiting factor for operation thereof. Provided by the unique switching arrangement of relay 62 and reed switch 70 any combination of oscillatory circuits and voltage sources can be obtained depending on preferred requirements of various animals. By way of example, one pulsing circuit 19 may be provided with two voltage sources 36 and 56 which can be alternately switched in circuit with the pusling circuit 19 as one or the other voltage sources becomes weak, thereby providing an emergency voltage supply located inside an animal's body. Also, by way of example, the pulsing circuits 19 and 20 may be provided with one voltage supply which is alternately switched, by the magnet 80 in proximity with reed switch 70 to provide either a different rate of heart stimulus or to provide an emergency pulsing circuit in the event of a failure of one or the other pulsing circuits.

The electronic heart stimulating system 10 is designed to be encapsulated by potting material which is compatible to the interior of an animal's body. For optimum utility the heart stimulating system 10, which in the present instance measures 8 centimeters by 6 centimeters by 2 centimeters, is placed in the abdominal region approximately 2 centimeters beneath the skin. It is also noted herein that the stimulating system 10 can be constructed in a symmetrical manner as to eliminate the possibility of inserting it in the animal backwards, which may render the switching device inoperative to a magnetic field in proximity therewith.

Shown in FIG. 2 is a diagrammatic representation of a switching system which can be used in the embodiment of FIG. 1 to provide operation from a magnet 100 when placed in proximity with either side wall 101 or 102 of an encapsulated heart stimulating unit 105. When the magnet 100 is placed near a body wall 107, the magnetic field therefrom is induced through the body wall 107 and acts with magnetic contacts 110 and 111. One polarity of magnet 100 will result in pivoting of movable contactor 113 about point 114 to cause the contactor 113 to be engaged with magnetic contacts 110 and 117. The reverse action occurs when the magnet 100 is reversed in its polarity, and contactor 113 moves into engagement with contacts 111 and 116.

SUMMARY OF OPERATION

The heart stimulating system shown in FIG. 1 has pulsing circuits 19 and 20 which are connected to common terminals 13 and 14 and provide a .2 millisecond square wave pulse of approximately 6 volts to electrodes 15 and 16, thereby providing muscular stimulus to an animal's heart. In the preferred embodiment, oscillatory circuits 19 and 20 have pulsing rates of 70 pulses per minute and 90 pulses per minute respectively. However, this is not to be construed as a limiting factor because different animals may require heat stimulation at different rates. Also, it may be advantageous to maintain the pulsing circuits 19 and 20 at the same pulsing rate whereby one pulsing circuit may be used in emergencies. By placing a magnetic field exterior of the animal's body, but in proximity with the reed switch 70 for actuation thereof, the pulsing circuits 19 and 20 can be alternately energized by connecting their separate voltage sources 36 and 56 through the contactor 60.

Shown in FIG. 2 is a switching arrangement which has symmetrical actuating properties for actuation by an external magnet 100. In this arrangement either end wall 101 and end wall 102 of an encapsulated heart stimulating unit 105 can be placed near the body wall 107 of an animal.

Although the description of this invention has been given with respect to a particular embodiment, it is not to be construed in a limiting sense. Therefore, the foregoing description of this invention concerns only the preferred embodiments thereof, and that accordingly changes and modifications may be made therein by those skilled in the art without departing from the spirit and scope of the novel concepts of this invention.

The principles of the invention explained in connection with the specific exemplifications therein will suggest many other applications and modifications of the same. It is accordingly desired that, in construing the breadth of the appended claims they shall not be limited to the specific details shown and described in connection with the exemplifications thereof.

I claim as my invention:

1. A device for implantation within a living body for supplying an electrical stimulus to tissue within the body, comprising:

output means for connection to said tissue, first and second batteries for supplying direct current electric power, a first oscillatory circuit having its output connected to said output means and operative when connected to said first battery to receive energizing direct current electric power therefrom causing oscillation of said first oscillatory circuit and the supply of an electric stimulus to said output means, a second oscillatory circuit having its output connected to said output means and operative when connected to said second battery to receive energizing direct current electric power therefrom causing the oscillation of said second oscillatory circuit and the supply of an electric stimulus to said output means, switch means providing a closed first electric current flow path in a first condition thereof and providing a closed second electric current flow path in a second condition thereof, first electric circuit means including said first electric current flow path connecting said first battery to the first oscillatory circuit in the first condition of said switch means, second electric circuit means including said second electric current flow path connecting said second battery to the second oscillatory circuit in the second condition of said switch means, wall means encapsulating said first and second batteries, said first and second oscillatory circuits, said switch means, and said first and second electric circuit means as a unit for implantation within the living body, and actuating means encapsulated by said wall means and controlling said switch means and operable to actuate said switch means from its first condition to its second condition, and responsive to a magnetic field from a source external to the living body to shift said switch means to said second condition and thereby to activate said second oscillatory circuit to supply said electrical stimulus to said output means.

2. The device of claim 1 with said actuating means being operable to actuate said switch means from its first condition to its second condition in response to a magnetic field of a first polarity from a source external to the living body and operable to actuate said switch means from its second condition to its first condition in response to a magnetic field of a second polarity from a source external to the living body, the first electric current flow path being open in the second condition of the switch means to deactivate the first oscillatory circuit while the second oscillatory circuit is connected to said second battery, and the second electric current flow path being open in the first condition of the switch means to deactivate said second oscillatory circuit while the first battery is connected to the first oscillatory circuit.

3. The device of claim 1 with said switch means comprising:

a relay coil and providing third and fourth electric current flow paths connected to respective opposite terminals of said relay coil and being closed respectively in the first and second conditions of said switch means, first and second charge storage means connected to the respective opposite terminals of said relay coil, said actuating means comprising a magnetic field operated switch in one condition thereof connecting one of said batteries with the third electric current flow path and the first charge storage means in the first condition of said switch means, and connecting one of said batteries with the fourth electric current flow path and the second charge storage means in the second condition of said switch means, whereby at least one of said charge storage means is charged in either condition of said switch means, said magnetic field operated switch in a second condition thereof connecting the charged charge storage means in a discharge circuit including said relay coil to momentarily energize said relay coil and thereby shift the condition of said switch means from either of its first and second conditions to the other of its first and second conditions without the necessity for continuous energization of said relay coil.

4. A device for implantation within a living body for supplying an electrical stimulus to tissue within the body, comprising:

a pair of oscillatory circuits having a pair of common output terminals, a pair of voltage sources each having one side thereof connected to a respective one of said oscillatory circuits, a switch having a first contact connected to the other side of one of said voltage sources and a second contact connected to the other side of the other of said voltage sources, and having a movable contactor connected to each of said oscillatory circuits and engaging said first contact and selectively engageable with said second contact, and means for actuating said switch to shift said contactor from said first contact to said second contact, thereby deenergizing one of said oscillatory circuits and energizing the other of said oscillatory circuits.

5. A device for implantation within a living body for supplying an electrical stimulus to tissue within the body, comprising:

first and second oscillatory circuits having respective outputs, a pair of common output terminals, and means connecting the output of each of said oscillatory circuits to said pair of common output terminals, first and second voltage sources each having one side connected to a respective one of said oscillatory circuits, a switch having first and second contacts connected to the other side of said first and second voltage sources respectively, and having a movable contactor connected to said first and second oscillatory circuits and normally engaging said first contact, relay means connected to said switch for actuating said switch to move said contactor from engagement with said first contact to engagement with said second contact thereby deenergizing said first oscillator's circuit and energizing said second oscillatory circuit, capacitor connected in circuit with said relay means and one of said voltage sources, and means for actuation by an energy source external to the living body controlling discharge of said capacitor through said relay means for actuation thereof and responsive to the selective positioning of said energy source to initiate discharge of said capacitor through said relay means to energize said second oscillatory circuit.

6. A device for implantation within a living body for supplying an electrical stimulus to tissue within the body, comprising:

first and second oscillatory circuits each having an output, a pair of common output terminals, and means connecting the output of each of said oscillatory circuits to said pair of common output terminals, first and second voltage sources each having one side thereof connected to a respective one of said oscillatory circuits for energizing the respective one of said oscillatory circuits, switching means having first and second contacts connected to the other side of said first and second voltage sources respectively, and having a movable contactor connected to said first and second oscillatory circuits, coil means connected to said switching means for actuating said contactor from a position in engagement with said first contact to a position in engagement with said second contact and from a position in engagement with said second contact to a position in engagement with said first contact to alternatively and selectively connect said first voltage source to said first oscillatory circuit and said second voltage source to said second oscillatory circuit, a reed switch having first and second terminals and having movable contactor means engaging the first terminal in one position thereof and engaging the second terminal in another position thereof, the first terminal being connected to one of said voltage sources, a capacitor having one side thereof connected to said second terminal of said reed switch and having its opposite side connected to one side of said coil means, means providing a charging circuit for said capacitor including said first terminal and said movable contactor means of said reed switch in said one position of said movable contactor means, means providing a discharge circuit for said capacitor through said coil means including said movable contactor means and said second terminal of said reed switch, and said reed switch being responsive to a magnetic field source positioned external to said living body for moving said movable contactor means between its one position in engagement with said first terminal of said reed switch and its other position in engagement with said second terminal of said reed switch.

7. The device of claim 6 wherein said first terminal of said reed switch is magnetized material of one polarity and said second terminal of said reed switch is a magnetized material of another polarity, and said reed switch is responsive to an external magnetic field of one polarity to shift said movable contactor means from engagement with said first terminal of said reed switch into engagement with said second terminal of said reed switch and is responsive to a magnetic field external to said living body and of opposite polarity to shift said movable contactor means from engagement with said second terminal of said reed switch into engagement with said first terminal of said reed switch.

8. A device for implantation within a living body for supplying an electrical stimulus to tissue within the body, comprising: an implantable case for implantation completely within the body and having output means for connection to said tissue, means entirely within said case including two separate energy sources within said case for alternately supplying electrical energy to said output means, magnetic field controlled switch means in said case for switching said supplying means from one of said energy sources to the other of said energy sources while the case is completely implanted within a living body, and means comprising a magnetic field source external to the body for actuating said switch means.

9. The device of claim 8 with said supplying means comprising a first oscillatory circuit receiving power from one of said energy sources and a second oscillatory circuit receiving energy from the other of said energy sources, said first oscillatory circuit having frequency determining circuitry for supplying an output at a first pulse repetition rate, said second oscillatory circuit including frequency determining circuitry for supplying electrical pulse energy at a second pulse repetition rate substantially different from said first pulse repetition rate, and said switch means comprising a magnetic reed switch capable of being actuated by said magnetic field source external to a living body in which the case is completely implanted to switch said supplying means between the first pulse repetition rate and the second pulse repetition rate.

10. A device for implantation within a living body for supplying an electrical stimulus to tissue within the body, comprising:

first and second oscillatory circuits each having an output, a pair of common output terminals, and means connecting the output of each of said oscillatory circuits to said pair of common output terminals, energy supply means having one operative side thereof connected to said oscillatory circuits for energizing the respective oscillatory circuits, switching means having first and second contacts and a movable contactor cooperable with said first and second contacts, said switching means being operatively connected to the other operative side of said energy supply means and the respective oscillatory circuits for selective energization thereof, coil means connected to said switching means for actuating said contactor from a position in engagement with said first contact to a position in engagement with said second contact and from a position in engagement with said second contact to a position in engagement with said first contact to alternately and selectively connect said energy supply means to said first oscillatory circuit or to said second oscillatory circuit, a reed switch having first and second terminals and having movable contactor means engaging the first terminal in one position thereof and engaging the second terminal in another position thereof, the first terminal being connected to said voltage supply means, a capacitor having one side thereof connected to said second terminal of said reed switch and having its opposite side connected to one side of said coil means, means providing a charging circuit for said capacitor including said first terminal and said movable contactor means of said reed switch in said one position of said movable contactor means, means providing a discharge circuit for said capacitor through said coil means including said movable contactor means and said second terminal of said reed switch, and said reed switch being responsive to a magnetic field source positioned external to said living body for moving said movable contactor means between its one position in engagement with said first terminal of said reed switch and its other position in engagement with said second terminal of said reed switch.

11. A device for implantation within a living body for supplying an electrical stimulus to tissue within the body, comprising:

first and second oscillatory circuits having respective outputs, a pair of common output terminals, and means connecting the output of each of said oscillatory circuits to said pair of common output terminals, voltage supply means, a switch having a movable contactor and cooperable stationary contacts, said switch being so connected to said voltage supply means and said oscillatory circuits that either of said oscillatory circuits may be connected to said supply means, relay means connected to said switch means for actuating said switch to move said contactor from one to the other of said contacts for effecting selection of one of said oscillatory circuits, capacitor means connected in circuit with said relay means and said voltage supply means, an energy source external to the living body, and means actuatable by said external energy source for controlling discharge of said capacitor means through said relay means for actuation thereof and responsive to the selective positioning of such an energy source to initiate discharge of said capacitor through said relay means and actuation thereby of said switch.

12. A device for implantation within a living body for producing electrical pulses for use in connection with the stimulation of tissue within the body, comprising an implantable case for implantation completely within the body, a first oscillatory circuit constructed to provide electrical pulses having predetermined operational characteristics, a second oscillatory circuit constructed to provide electrical pulses having predetermined operational characteristics different from those of the first oscillatory circuit, said oscillatory circuits having a common output at which said pulses appear, energy supply means for said circuits, entirely within said case, magnetic field controlled switch means in said case for selectively operatively connecting either of said oscillatory circuits to said energy supply means, and means comprising a magnetic field source external to the body for actuating said switch means.

13. A device according to claim 12, wherein each oscillatory circuit is an individually complete and independently operable oscillatory circuit, whereby each circuit may be utilized as a standby circuit substitutable for the other in the event of failure of the latter.

References Cited

UNITED STATES PATENTS

| | | | |
|---|---|---|---|
| 3,195,540 | 7/1965 | Waller | 128—422 |
| 3,241,556 | 3/1966 | Zacouto | 128—421 |
| 3,311,111 | 3/1967 | Bowers | 128—422 |

WILLIAM E. KAMM, Primary Examiner